US012773923B2

(12) United States Patent
Mackay

(10) Patent No.: US 12,773,923 B2
(45) Date of Patent: *Oct. 27, 2026

(54) HYBRID-ELECTRIC AND ALL-ELECTRIC AIRCRAFT POWER SYSTEMS

(71) Applicant: PRATT & WHITNEY CANADA CORP., Longueuil (CA)

(72) Inventor: Daniel Mackay, Thornhill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,108

(22) Filed: Apr. 25, 2024

(65) Prior Publication Data

US 2024/0270409 A1 Aug. 15, 2024

Related U.S. Application Data

(63) Continuation of application No. 17/322,739, filed on May 17, 2021, now Pat. No. 11,999,509.

(51) Int. Cl.
*B60L 53/80* (2019.01)
*B60L 9/00* (2019.01)
(Continued)

(52) U.S. Cl.
CPC ................. *B60L 53/80* (2019.02); *B60L 9/00* (2013.01); *B60L 50/50* (2019.02); *B60L 53/16* (2019.02);
(Continued)

(58) Field of Classification Search
CPC .......... B64F 1/3694; B64F 5/40; B64F 1/352; B64D 27/24; B64D 27/33; B64U 50/37;
(Continued)

(56) References Cited

U.S. PATENT DOCUMENTS 6,631,775 B1 10/2003 Chaney
8,439,303 B2 5/2013 Koletzko
(Continued)

FOREIGN PATENT DOCUMENTS

CN 212529379 U 2/2021
EP 3594125 A1 1/2020
(Continued)

OTHER PUBLICATIONS

"Aviation ordnancemen remove an AIM-7 Sparrow III missile from a Fighter Squadron 32 (VF-32) F-14A Tomcat." NARA & DVIDS Public Domain Archive, Jan. 1, 1990, nara.getarchive.net/media/aviation-ordnancemen-remove-an-aim-7-sparrow-ii i-missile-from-a-fighter-squadron-b 762f6. (Year: 1990).
(Continued)

*Primary Examiner* — Joshua D Huson
(74) *Attorney, Agent, or Firm* — Norton Rose Fulbright Canada LLP

(57) ABSTRACT

A system for an aircraft, includes an electric energy module; and a connector module operatively connected to the electric energy module. The connector module is: structured to attach the electric energy module to the aircraft when the connector module in an engaged mode while in use, and operable between the engaged mode and a disengaged mode, the connector module in the disengaged mode while in use disengaging the electric energy module from the aircraft.

9 Claims, 9 Drawing Sheets

(51) Int. Cl.
*B60L 50/50* (2019.01)
*B60L 53/16* (2019.01)
*B64D 27/33* (2024.01)
*B64F 1/35* (2024.01)
*B64F 5/40* (2017.01)

(52) U.S. Cl.
CPC ................ *B64F 1/352* (2024.01); *B64F 5/40* (2017.01); *B60L 2200/10* (2013.01); *B64D 27/33* (2024.01)

(58) Field of Classification Search
CPC ......... B64U 50/39; B60L 53/80; B60L 53/16; B60L 50/50; B60L 9/00; B60L 2200/10
USPC ........................................................... 244/1 R
See application file for complete search history.

(56) References Cited

U.S. PATENT DOCUMENTS

| | | | |
|---|---|---|---|
| 8,469,306 | B2 | 6/2013 | Kuhn, Jr. |
| 8,511,613 | B2 | 8/2013 | Droney |
| 8,727,271 | B2 | 5/2014 | Salyer |
| 8,967,529 | B1 | 3/2015 | Bennett |
| 9,108,730 | B2 | 8/2015 | Grossman |
| 9,174,741 | B2 | 11/2015 | Suntharalingam et al. |
| 9,193,451 | B2 | 11/2015 | Salyer |
| 9,346,560 | B2 | 5/2016 | Wang |
| 9,527,605 | B1 | 12/2016 | Gentry |
| 9,550,582 | B2 | 1/2017 | Wang |
| 9,701,284 | B2 | 7/2017 | Poillot |
| 9,776,714 | B2 | 10/2017 | Shapery |
| 9,873,408 | B2 | 1/2018 | Capizzo |
| 10,153,636 | B1 | 12/2018 | Vander Lind et al. |
| 10,453,348 | B2 | 10/2019 | Speasl |
| 10,988,253 | B2 | 4/2021 | Perry et al. |
| 11,682,917 | B1 | 6/2023 | Piasecki |
| 11,828,417 | B2 | 11/2023 | Clarke et al. |
| 11,993,161 | B2 | 5/2024 | Johnson |
| 12,162,626 | B2 | 12/2024 | Wankewycz |
| 2004/0211862 | A1 | 10/2004 | Elam |
| 2008/0011900 | A1 | 1/2008 | Quintana |
| 2008/0017426 | A1 | 1/2008 | Walters et al. |
| 2010/0065691 | A1* | 3/2010 | Droney ................ B64D 27/357 244/65 |
| 2010/0097183 | A1 | 4/2010 | Pollema |
| 2013/0168499 | A1 | 7/2013 | Grossman |
| 2017/0096075 | A1 | 4/2017 | Henry et al. |
| 2017/0283090 | A1 | 10/2017 | Miller |
| 2017/0327091 | A1 | 11/2017 | Capizzo |
| 2017/0341725 | A1 | 11/2017 | Skahan |
| 2018/0290746 | A1 | 10/2018 | Hanna et al. |
| 2019/0033932 | A1 | 1/2019 | Ku |
| 2020/0172245 | A1 | 6/2020 | Thrun |
| 2020/0290742 | A1 | 9/2020 | Kumar et al. |
| 2020/0346555 | A1 | 11/2020 | Bernhardt |
| 2022/0009648 | A1 | 1/2022 | Clarke |
| 2022/0041299 | A1 | 2/2022 | Wankewycz |
| 2022/0074548 | A1 | 3/2022 | Clarke |
| 2022/0144125 | A1 | 5/2022 | Cho |
| 2022/0204154 | A1 | 6/2022 | Roe et al. |
| 2022/0379747 | A1* | 12/2022 | Johnson .................... B64F 1/36 |
| 2025/0010757 | A1 | 1/2025 | Lachance |

FOREIGN PATENT DOCUMENTS

| | | | |
|---|---|---|---|
| JP | 2015137092 | A | 7/2015 |
| JP | WO2017126584 | A1 | 12/2018 |
| KR | 20170097482 | A | 8/2017 |
| WO | 2012/052511 | A1 | 4/2012 |
| WO | 2018058137 | A1 | 3/2018 |
| WO | 2018099856 | A1 | 6/2018 |
| WO | 2019028071 | A1 | 2/2019 |
| WO | 2019186118 | A1 | 10/2019 |
| WO | 2021046769 | A1 | 3/2021 |

OTHER PUBLICATIONS

"Tronair 04-6031-0100 Falcon 900 / 900EX Battery Lift I PilotJohn GSE." Wayback Machine, archived on May 9, 2021 at web.archive.org/web/20210509073938/https://pilotjohn.com/new/tronair/04-6031-0100. (Year: 2021).

European Patent Office, Extended European Search Report for European Patent Application No. EP22173738.0, Sep. 26, 2022.

European Patent Office, Communication re. extended European search report for European patent application No. 25194992.1, Sep. 26, 2025.

European Patent Office, Communication re: extended European search report mailed May 19, 2026 re: European Patent Application No. 26153051.3.

* cited by examiner

HYBRID-ELECTRIC AND ALL-ELECTRIC AIRCRAFT POWER SYSTEMS

CROSS REFERENCE TO RELATED APPLICATION

The present application is a continuation of U.S. patent application Ser. No. 17/322,739 filed on May 17, 2021, the entire contents of which are hereby incorporated herein by reference.

TECHNICAL FIELD

This disclosure relates to systems and methods for hybrid-electric and all electric aircraft, and more particularly to systems and methods for handling related components of such aircraft.

There is always a need to improve aircraft propulsion systems, integration, and safety, including for improved energy source integration into aircraft and related ground operations.

SUMMARY

A system for an aircraft, comprises an electric energy module; and a connector module operatively connected to the electric energy module. The connector module is: structured to attach the electric energy module to the aircraft with the connector module in an engaged mode while in use, and operable between the engaged mode and a disengaged mode. With the connector module in the disengaged mode while in use, the electric energy module is disengaged from the aircraft.

An electric machine is attached to the electric energy module and electrically connected to the electric energy module. The electric machine is electrically connected to the electric energy module via a plurality of conductors, and a majority of each conductor of the plurality of conductors is disposed in its entirety mechanically between the electric machine and the electric energy module.

In some embodiments, an aircraft comprises the system as recited in above, and an electrically-powered system. In some such embodiments, the electric energy module is attached to the aircraft via the connector module and is electrically connected to the electrically-powered system. The electric energy module is electrically connected to the electrically-powered system via the connector module, and the connector module is structured to electrically disconnect the electric energy module from the electrically-powered system when the connector module is operated from the engaged mode to the disengaged mode. The electric energy module is positioned relative to the aircraft such that when the connector module is in the disengaged mode and the aircraft is stationary on a ground, gravity acts on the electric energy module to move the electric energy module toward the horizontal ground.

In some embodiments, the electric energy module comprises an electrical connector on a side of the electric energy module that faces toward the ground when the aircraft is stationary on the ground; the electrical connector is electrically connected to the electric energy module; and the electrical connector is sized to charge the electric energy module when connected to an electric power source.

In some embodiments, the connector module includes a movable member and an actuator operatively connected to the movable member to move the member while the system is in use between a engaged position in which the movable member engages the electrical energy module to the aircraft and a disengaged position in which the movable member disengages the electrical energy module from the aircraft, the movable member being in the engaged position when the connector module is in the engaged mode, and the movable member being in the disengaged position when the connector module is in the disengaged mode.

In some embodiments, the movable member is one of a plurality of movable members. In some such embodiments, a first sub-set of the plurality of movable members is disposed on a first side of the electrical energy module and a second sub-set of the plurality of movable members is disposed on a second side of the electrical energy module, and the second side is opposite the first side. In embodiments, the movable member is slidable between the engaged position and the disengaged position.

In embodiments, one of the electrical energy module and the aircraft comprises a mating female structure corresponding to the movable member; the movable member extends into the mating female structure when the movable member is in the engaged position; and the movable member is disposed outside of the mating female structure when the movable member is in the disengaged position.

In some embodiments, an on-ground service system, includes the aircraft as described above and a ground vehicle that includes an electrical connector structured to electrically connect to the electrical connector of the electrical energy module when the aircraft is stationary on the ground. The electrical energy module comprises a support structure that is structured to support a weight of the electrical energy module; an the ground vehicle further comprises a movable structure, the movable structure being structured to movable relative to a rest of the ground vehicle to engage the support structure and to remove the electrical energy module from the aircraft while engaged to the support structure.

In embodiments, the electrical connector of the ground vehicle is part of the movable structure of the ground vehicle. In embodiments, the electrical connector of the electrical energy module is part of the support structure of the electrical energy module and is positioned relative to the support structure such that when the movable structure engages the support structure, the electrical connector of the ground vehicle electrically connects to the electrical connector of the electrical energy module.

An electrical machine attached to the electrical energy module such that the electrical machine is removable from the aircraft together with the electrical energy module as a unit, and wherein the movable structure of the ground vehicle and the ground vehicle are structured to support a weight of the unit.

In some embodiments, the aircraft of as recited above is a first aircraft; the on-ground service system further comprises a second aircraft that is of a different model than the first aircraft; and the second aircraft is structured to removably receive the electrical energy module of the first aircraft from the ground vehicle to power at least one system of the second aircraft.

An aircraft comprises, a receptacle defined in any of: a wing of the aircraft, a tail of the aircraft, and/or a fuselage of the aircraft, the electrical machine receptacle configured to receive an aircraft power system, and a member operatively connected to the electrical machine receptacle, the member movable between an engaged mode in which the member secures the aircraft power system to the electrical machine receptacle and a disengaged mode in which the member is disengaged from the aircraft power system and the aircraft power system is disengaged from the electric machine receptacle.

In embodiments, the aircraft power system includes one of or both of an electrical energy module and an electrical machine. The member includes a conductor electrically connected to an electrical system of the aircraft, wherein in the engaged mode, the member contacts the conductor of the power system and thereby electrically connects the one of or both of the electrical energy module of the power system and the electrical machine of the power system to the electrical system of the aircraft.

In the disengaged mode of the member the conductor of the member is out of contact with the conductor of the power system and thereby electrically disconnects the one of or both of the electrical energy module of the power system and the electrical machine of the power system from the electrical system of the aircraft.

In some embodiments, a method of servicing an aircraft, comprises positioning the aircraft on a ground; while the aircraft is on the ground, actuating a connector module of the aircraft to release a power system of the aircraft; and while the aircraft is on the ground, moving the power system of the aircraft away from the aircraft using a mechanical system that is separate from the aircraft. In embodiments, the mechanical system is a ground vehicle.

In embodiments, while the aircraft is on the ground, moving a different power system to the aircraft in place of the power system and actuating the connector module to engage the different power system to the aircraft.

In some embodiments, each one of the power system and the different power system includes one of an electric machine operatively connected to an electric power source of the aircraft when that one of the power system and the different power system is engaged to the aircraft; and both a given electric machine and an electrical energy module electrically connected to the given electric machine to power the given electric machine.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the systems and methods of the subject disclosure without undue experimentation, embodiments thereof will be described in detail herein below with reference to certain figures, wherein.

DETAILED DESCRIPTION

Figure 1:
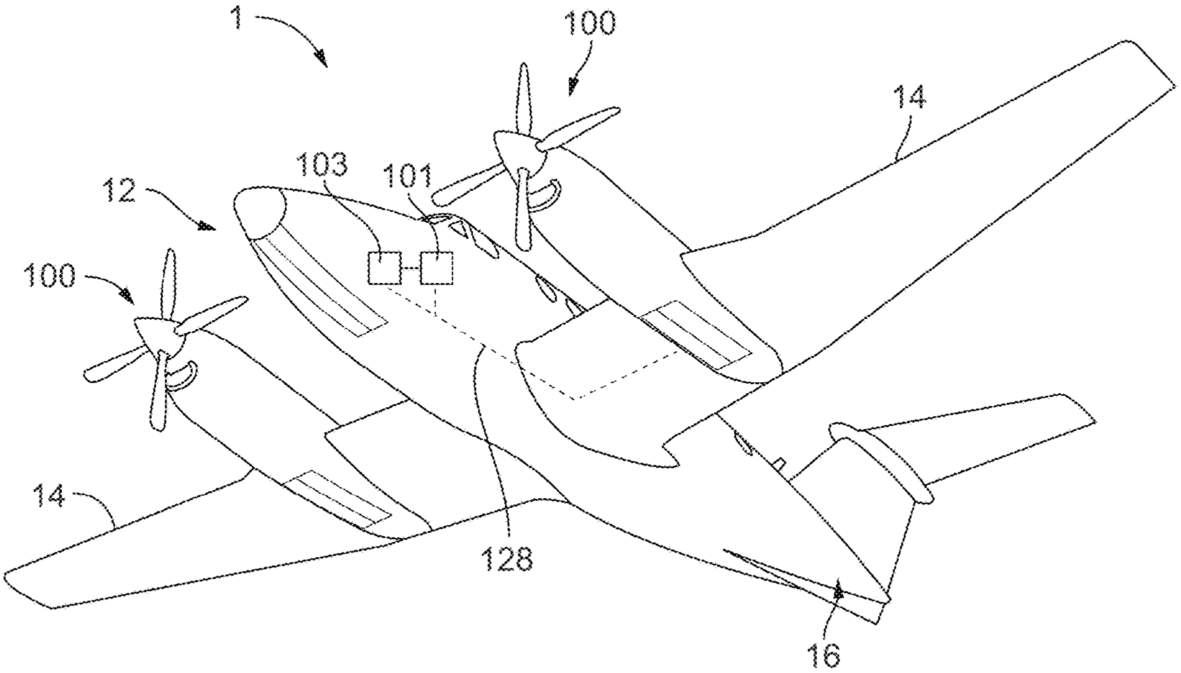
FIG. 1 is a schematic perspective view of an embodiment of an aircraft constructed in accordance with at least one aspect of the present disclosure, showing at least one location for an electric energy module.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated by reference character 100. Other embodiments of systems in accordance with the disclosure, or aspects thereof, are provided in FIGS. 2-15, as will be described.

The systems and methods described herein can be used to recharge electrical energy module(s) of aircraft, such as battery(ies), while an aircraft is on the ground and/or swap out a power system(s) in between flights of the aircraft, such as for example a depleted electric power system(s) of an aircraft with a compatible pre-charged power system(s). In some embodiments, an electric power system according to the present technology may be configured to be charged without being removed from the aircraft, such as for example by a vehicle, in some embodiments via quick connect(s) on the power system and corresponding quick connect(s) on the vehicle.

Moreover, the systems and methods can be used to swap power systems between a repository of power systems, including swapping out a power system requiring maintenance with a compatible ready-to-fly power system, such as for example between flights of a given aircraft in which cases at least in some situations time on ground and/or a difficulty of maintenance of the power system requiring maintenance may be reduced.

Shown in FIG. 1, an aircraft 1 includes a nose 12, wings 14, a tail 16, two power systems 100 and a controller 101. The controller 101 is operatively connected to the power systems 100. In this embodiment, the controller 101 is implemented as a single unit of hardware onboard the aircraft 1 which controls both of the power systems 100 of the aircraft 1. It is contemplated that any other embodiment of the controller 101 may be used and that the controller 101 may be implemented as any suitable hardware, including conventional hardware. For example, in some embodiments, each of the power systems 100 may include a controller onboard that power system 100.

Still referring to FIG. 1, in this embodiment the aircraft 1 includes an electrically powered system 103. In some embodiments, the electrically powered system 103 is a control module in the cockpit of the aircraft 1, is operatively connected to the controller 101, and is operable by the pilot(s) to execute various functions with respect to the power systems 100. In some embodiments, the electrically powered system 103 may be different. For example, in some embodiments the electrically powered system 103 may be one or more electric machines, such as electric motors driving one or more air movers to generate thrust for the aircraft 1. In some embodiments, the electrically powered system 103 may be an electric power source that is remote to the power system 100 and which may provide electrical power to the power system 100 in at least some embodiments and operating modes of the aircraft 1. In some embodiments, the electrically powered system 103 may be omitted. In some embodiments, the aircraft 1 may have multiple different electrically powered systems 103 one or more of which may be powered by the power system(s) 100 of the aircraft 1.

In the present embodiment the electrically powered system 103 is a control module which may be implemented as any suitable hardware, including conventional hardware. In this embodiment, the control module 103 is configured to, when in use, in response to a command by the pilot(s) of the aircraft 1 and/or via a command received from a suitable connection established to the control module 103 from a remote device of maintenance personnel while the aircraft 1 is stationary on the ground, send a signal, such as any suitable electronic signal via a wired and/or wireless connection, to a connector module 114*c* associated with one of, each of, or both of the power systems 100 (depending on the number of power systems 100 of the particular embodiment of aircraft 1) to operate the connector module(s) 114*c* to disengage the one of, each of, or both of the power systems 100 from the aircraft 1, respectively.

In some embodiments, the power systems 100 may each have a dedicated controller 101, for example instead of the common controller 101 in the present embodiment, configured to provide for the functionality described herein. The controller(s) 101 may be operable via a remote connection, which may be wired or wireless, to execute various functions with respect to the power systems 100. For example, in a particular embodiment, the aircraft 1 may include a suitable wired connector and/or a suitable wireless module via which the controller 101 may be configured to be connected to and operated from a remote device while the aircraft 1 is on the ground.

Figure 2:
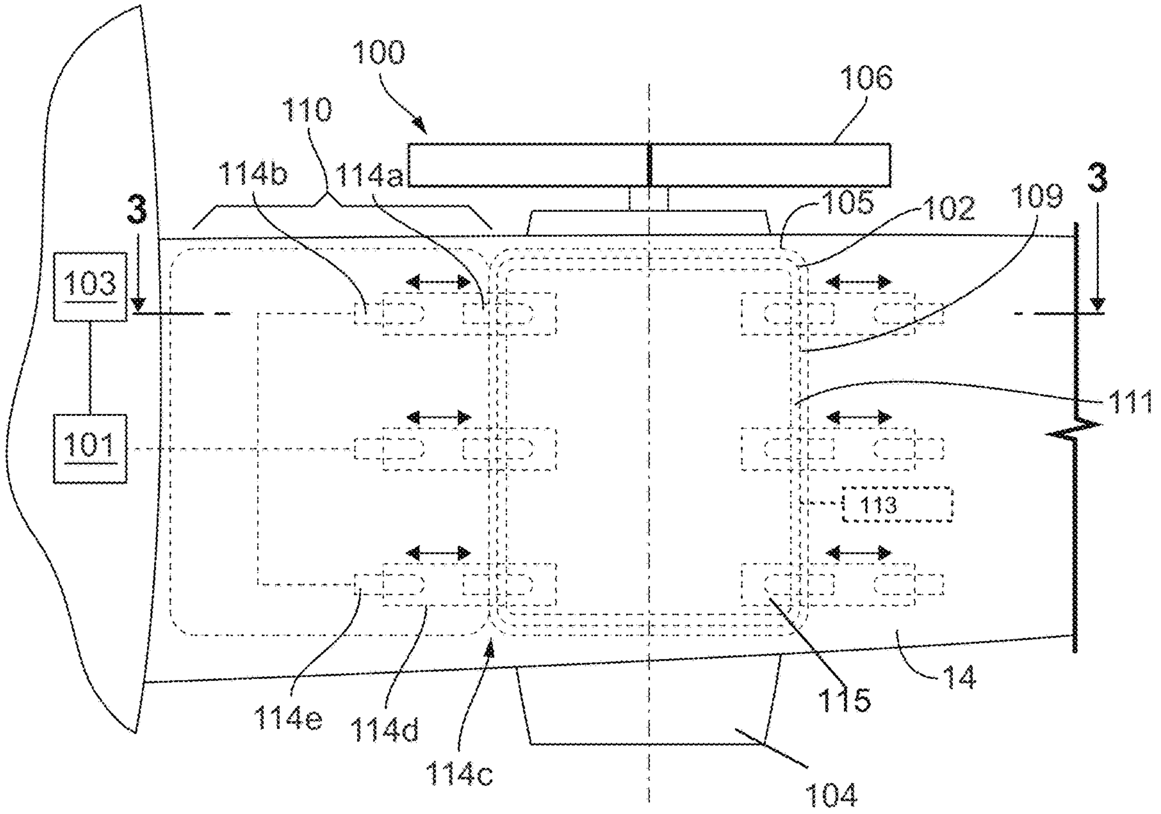
FIG. 2 is a schematic top down partial view of the aircraft of FIG. 1, showing an embodiment of an energy source mounted with an aircraft power system to an aircraft.

In the present embodiment, the controller 101 is operatively connected to the connector module 114*c* associated with each of the power systems 100. As shown in FIG. 2 with respect to one of the two similar power systems 100, in this embodiment each of the two connector modules 114*c* includes a plurality of actuators 114*d* on each of two opposite sides of an electric energy module 108 of the corresponding power system 100. As shown, in this embodiment each of the actuators 114*d* is operatively connected to a movable member 114*e*. Each of the actuators 114*d* is configured to move its movable member 114*e* between an engaged position 114*a* and a disengaged position 114*b*. In this embodiment, the movable members 114*e* are slidable between their respective engaged positions 114*a* and disengaged positions 114*b*. It is contemplated that other types of movable members may be used to provide for the functionality described herein. For example, it is contemplated that in some embodiments, pivoting members may be used. Yet other types of movable members, including a single movable member per power system 100 and a combination of different two or more types of movable members per power system 100, are likewise contemplated.

Figure 3:
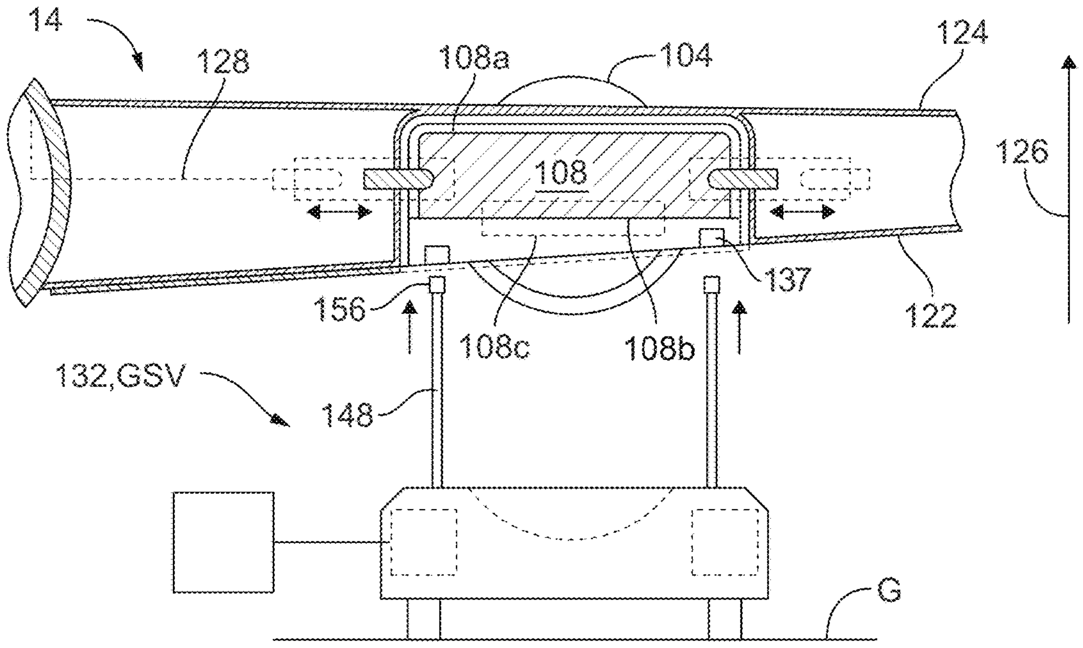
FIG. 3 is a schematic cross sectional side view of the aircraft power system of FIG. 2, showing an embodiment of mounting the power system within the aircraft.

As shown in FIGS. 2 and 3, in the present embodiment in the engaged position 114*a* the movable members 114*e* extend into corresponding mating female structures 115, which in this non-limiting embodiment are mating female apertures 115, in the electric energy module 108 and thereby secure/engage the electric energy module 108, and the power system 100, to the aircraft 1. Other corresponding mating structures, depending on each particular type/combination of movable member(s), are likewise contemplated.

As shown in FIGS. 2 and 3, in this particular embodiment, and not in all embodiments, one or more of the movable members 114*e* include conducting wires 128 and one or more of the mating apertures corresponding to the one or more of the movable members 114*e* are electrically connected to the electric energy module 108. The electric energy module 108 is thereby electrically connected to the electrically powered system 103 (in this embodiment controller 101) to power the electrically powered system 103. In other embodiments, the conducting wire(s) 128 and hence the selective electrical connection between the electric energy module 108 and the electrically powered system 103 may be omitted.

Further as shown in FIGS. 2 and 3, in the disengaged position 114*b* the movable members 114*e* of the connector module 114*c* are disposed outside of the corresponding mating apertures in the electric energy module 108 and thereby disengage the electric energy module 108 from the aircraft 1, allowing the power system 100 to be removed from the aircraft 1. More particularly, still referring to FIGS. 2 and 3, in the present embodiment the power system 100 is received in a cavity/receptacle 105 having a conforming geometry. Even more particularly in this embodiment, and not in all embodiments, the power system 100 includes an electric machine 104 attached to the electric energy module 108 and electrically connected to the electric energy module 108 via a plurality of conductors 108*c*. More particularly, in this embodiment the electrical connection is to battery cells of the electric energy module 108. The battery cells may be of any suitable type and are therefore not shown. It is contemplated that the electric energy module 108 may include a different type of energy source, such as capacitor(s) including super-capacitors, ultra-capacitors, or the like, to provide for the functionality described herein.

As shown in FIG. 3, in this particular embodiment, a majority of each of the conductors 108*c* is disposed in its entirety mechanically (as distinct from merely electrically) between the electric machine 104 and the electric energy module 108. Even more particularly in this particular embodiment, an entirety of each of the conductors 108 is disposed in its entirety mechanically (as distinct from merely electrically) between the electric machine 104 and the electric energy module 108. In some embodiments, the electric connection between the electric machine 104 and the energy module 108 can be a direct electrical connection via conductors 108*c*, which may allow for a shorter length and hence lower overall weight of the conductors 108*c*. In some embodiments, this may allow for a higher current, and hence more power transfer between the electric energy module 108 and the electric machine 104 at a given overall weight of the conductors 108*c*, compared to systems in which an electric machine powered by an electric energy source is remote from the electric energy source. As seen in FIG. 2, in this embodiment the electric machine 104 is operatively connected to a propeller 106 to drive the propeller 106.

Thus, the electrical connection provided by the conductors 108*c* may allow for a more efficient power transfer between the electric energy module 108 and the electric machine 104. For example, at takeoff, for a given acceptable overall weight of the conductors 108*c*, more electrical power may be supplied from the electric energy module 108 to the electric machine 104 and thus more thrust may be generated by the propeller 106. As another example, in some embodiments the controller(s) 101 associated with the power system 100 and the electric machine 104 may be configured to operate the power system 100 in an energy recuperation mode by windmilling the propeller 106 (which is just one example of an air mover that the power system 100 may use) to drive the electric machine 104 as an electrical energy generator and thereby charge the electric energy module 108.

Shown in FIG. 3, the power system 100 in this embodiment further includes electrical connectors 137 positioned on a side of the power system 100 that faces toward the ground G when the aircraft 1 is stationary on the ground G. The electrical connectors 137 are electrically connected to the electric energy module 108 and are sized to charge the electric energy module 108 when connected to an electric power source, such as one that may be provided via a ground service vehicle (GSV) for example.

Still referring to FIG. 3, the electrical connectors 137 are on a bottom side 108*b* of the power system 100. In this embodiment, the electric energy module 108 is positioned relative to the aircraft 1 such that when the connector module 114*c* is in the disengaged mode (i.e. the movable members 114*e* are in the disengaged position 114*b* in this embodiment) and the aircraft 1 is stationary on the ground G, gravity acts on the power system 100 to move the power system 100 toward the ground G and this may make removal of the power system 100 from the aircraft 1 easier in some cases. In this embodiment, and not necessarily in all embodiments, the electrical connectors 137 are part of the electric machine 104. In other embodiments, such as where the power system 900 in FIG. 9, the electrical connectors 137 are part of the electric energy module 108. Other positioning and combinations of electrical connectors 137, where these are present, are likewise contemplated. It's likewise contemplated that in some embodiments, a single electrical connector 137 may be used.

The electric machine 104 can be configured to consume electrical energy to drive a component, (e.g. act as an electric motor) and/or covert mechanical energy into electrical energy (e.g. act as a generator). For example, in certain embodiments the "electric machine" can be an electric motor, and not a generator, while in other embodiments the electric machine 104 may be configured in certain flight conditions to permit windmilling to generate energy.

The energy source 108 is electrically connected to exchange electrical power with the electric machine 104. The electrical energy module includes a top side 108*a*, a bottom side 108*b*, where the bottom side 108*b* faces the ground G when the electrical energy module 108 is in a housing 102.

It is contemplated that the electrical connector module 110 can operatively and electrically connect the electric machine 104 to the electric energy module 108. The electrical connector module 110 can include one or more conductors (e.g. conductor 108*c*), one or more controllers (e.g. controller 101), and any other suitable components, some or all of which may be conventional and which may be selected using conventional engineering techniques to suit each particular embodiment of the power system 100 and enable its operation as described herein. It is contemplated that, while in illustrated embodiments the connector module 110 is an active (e.g. powered) module, in other embodiments the electrical connector module 110 may be a manually operated (e.g. not powered) module.

As shown in FIG. 3 for example, in some embodiments, the receptacle 105 can be defined in the wing 14, such that the receptacle 105 passes through at least a bottom surface 122 of the wing 14. For example, as shown in FIG. 2, the receptacle 105 can extend only partly through the wing 14, bound on a top side by a top surface 124 of the wing 14, opposite the bottom surface 122. In some such embodiments, the surfaces 122, 124 of the wing 14 define an airfoil shape with an upward lift direction 126.

Figure 4:
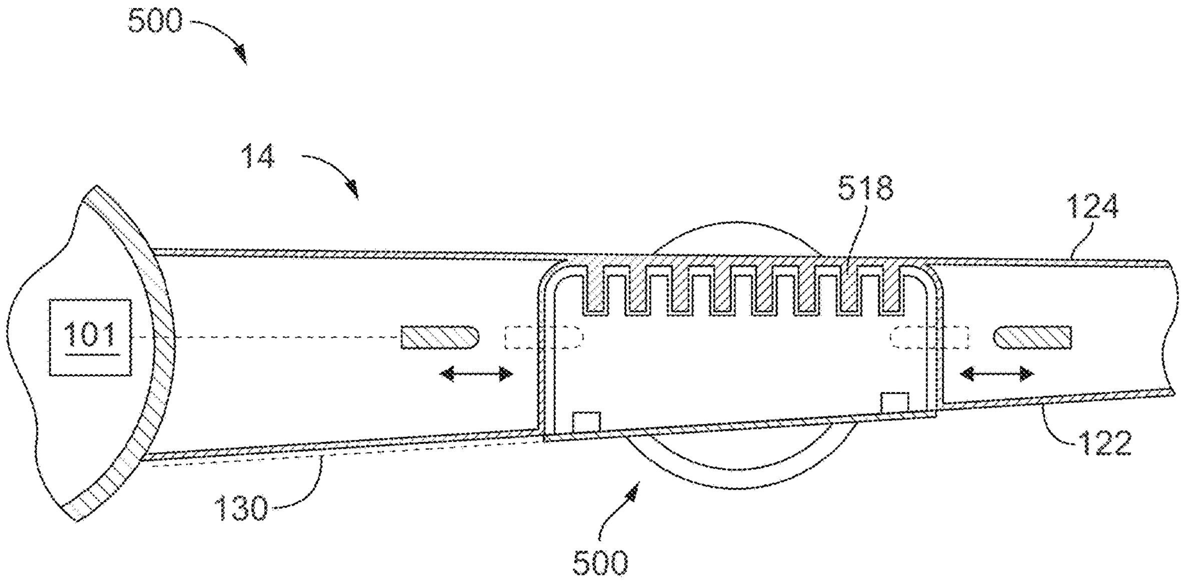
FIG. 4 is a schematic cross sectional side view of the aircraft power system of FIG. 2, showing an embodiment of a sliding panel.
Figure 5:
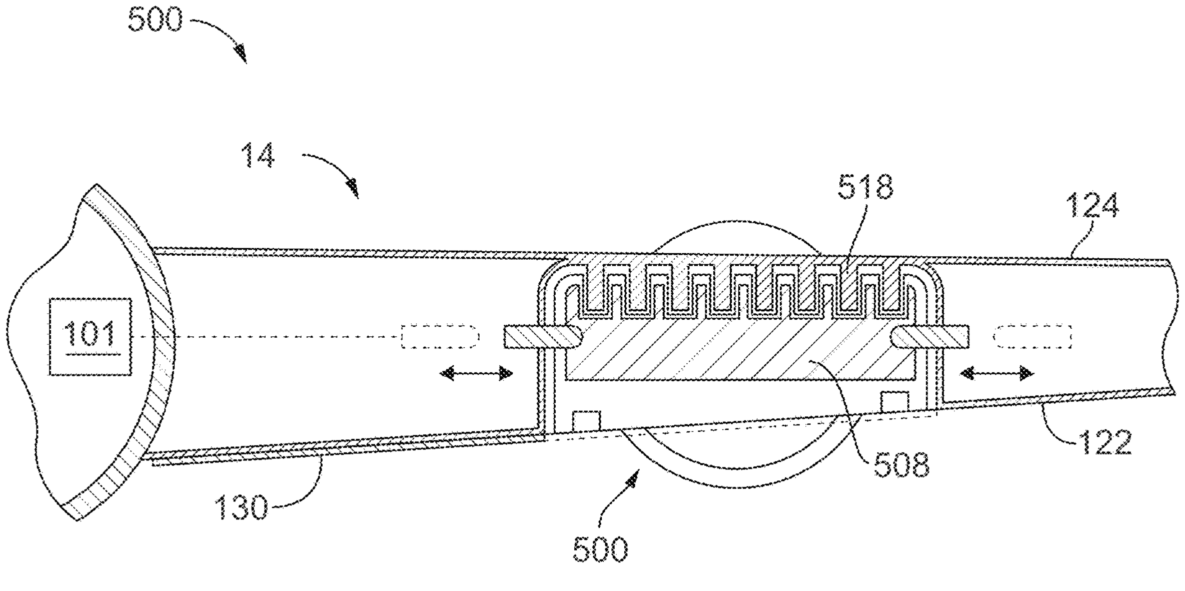
FIG. 5 is a schematic cross sectional side view of the aircraft power system of FIG. 2, showing another embodiment of mounting the power system within the aircraft.

Referring to FIGS. 4 and 5 now, a different embodiment of the aircraft 1 and a different embodiment of the power system 100 is shown. The wing 14 in this embodiment of the aircraft includes a panel 130 slidingly engaged to the bottom surface 122 of the wing 14 moveable between a closed position (as shown in FIG. 4) and an open position (as shown in FIG. 5). When a power system 100 is positioned in the receptacle 105 of the wing 14, the panel 130 is in the open position. In the absence of a power system 100 from the receptacle 105, the panel 130 is in the closed position and completes the airfoil shape of the bottom surface 122 of the wing 14. In the closed position, the panel 130 may help prevent elements from entering the receptacle 105. To provide for this operation, the panel 130 may be operatively engaged to a suitable powered actuator 113 controllable for example via the controller 101. In other embodiments, to provide for this operation, the panel 130 may be operatively engaged to a suitable passive actuator, such as a spring loaded actuator. Yet other mechanical arrangements that would enable the operation of the panel 130 as described herein are likewise possible and may be implemented using conventional elements and engineering techniques.

Referring to FIG. 5, depending on the size of the aircraft 1, and the size and weight of the power system 100, in some embodiments the wing 14 may include a ribbed structure 518 which may extend into the receptacle 105 and be structured to help support the power system 100 on the wing 14 and help maintain structural integrity of the wing 14. In some such embodiments, a corresponding portion of the power system 100, such as the electric energy module 508 may have a portion conforming to the shape of the ribbed structure 518. In some such cases, the fit between the conforming portion of the power system 100 and the ribbed structure 518 may allow for a relatively larger power system 100, such as for example a relatively larger electric energy module 508 with more electrical energy storage capacity.

Figure 6:
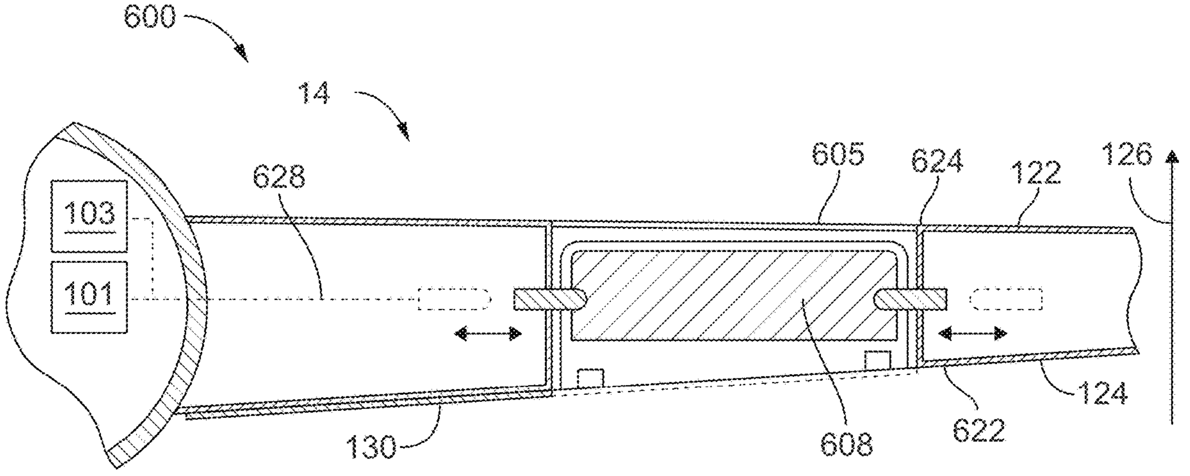
FIG. 6 is a schematic cross sectional side view of the aircraft power system of FIG. 2, showing another embodiment of mounting the power system within the aircraft.

Referring now to FIG. 6, a power system 600 and wing 14, which is yet another embodiment of the power system 100 and the wing 14, are shown. In this embodiment, the receptacle 605 extends through the wing 14, from the bottom surface 622 of the wing 14 to the top surface 624 of the wing 14. In this embodiment, the structural ribs of the wing 14 are positioned around the receptacle 605, e.g. ribs 818 in FIG. 8 and not necessarily with the varied rib spacing of FIG. 8.

Figure 7:
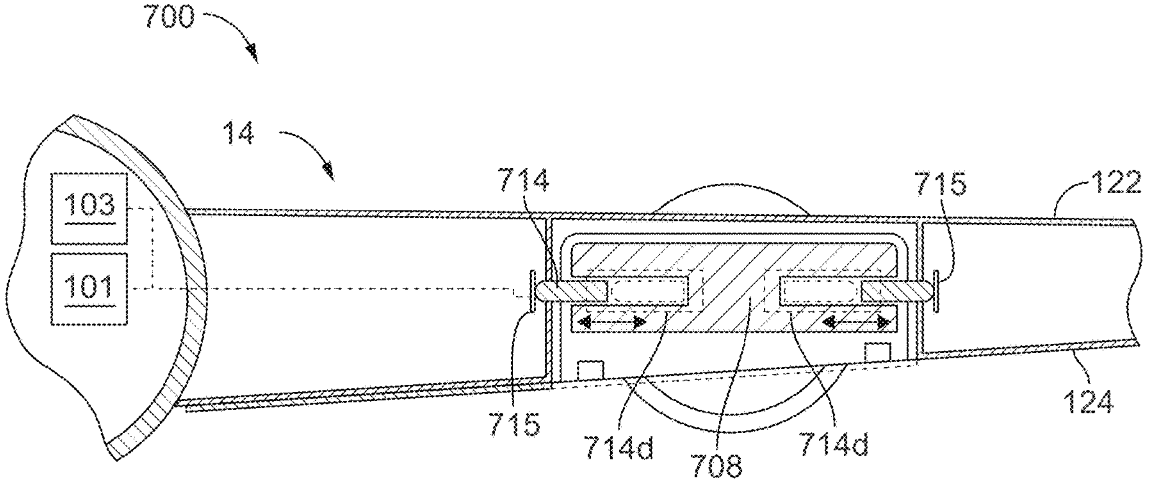
FIG. 7 is a schematic cross sectional side view of the aircraft power system of FIG. 2, showing another embodiment of mounting the power system within the aircraft.

In certain embodiments, such as shown in FIG. 7, the power system 700 can have any configuration as shown in FIGS. 2-6, however the movable members 714 and corresponding actuators 714*d* are disposed within the electric energy module 708. The movable members 714 are configured to be retractable into the electric energy module 708 by the actuators 714*d* to disengage the power system 700 from contacts 715 of the aircraft 1.

Figure 8:
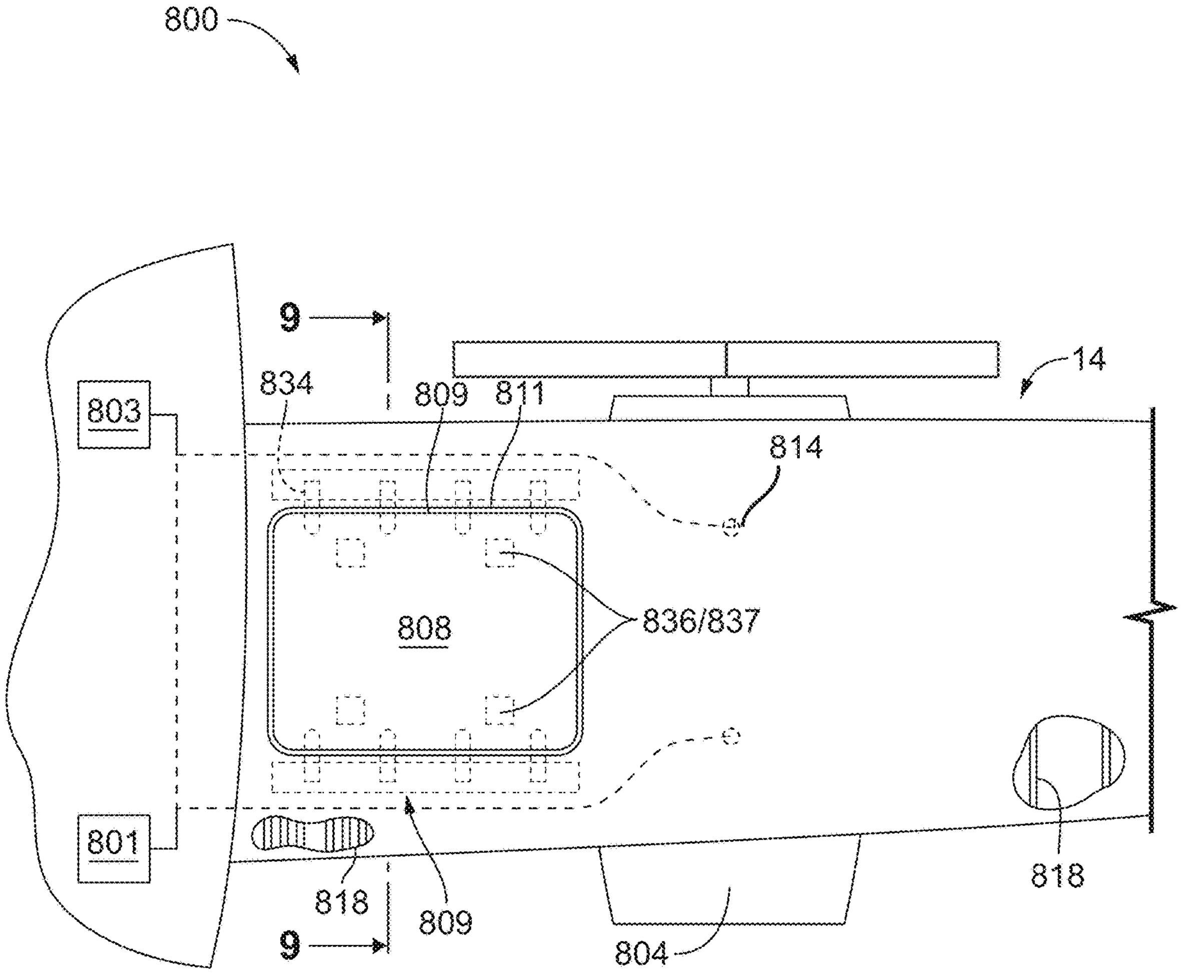
FIG. 8 is a schematic top down view of an embodiment of an aircraft constructed in accordance with at least one aspect of the present disclosure, showing an embodiment of an energy source mounted in an aircraft separate from an electric machine.

As shown in FIGS. 8-11, another embodiment of the power system 100, referred to as power system 800, includes similar features of aircraft power system 100, but the power system 800 excludes electric propulsion machines. Rather, the power system 800 includes the electric energy module 808 and a connector module 809 that selectively removably engages electric energy module 808 to a corresponding receptacle 811 in the wing 14. In some such embodiments, the wing ribs 818 may be provided in a higher density proximate the receptacle 811 relative to wing ribs in a remainder of the wing 14 to provide additional structural support. It is contemplated that in other embodiments, the receptacle 811 may be omitted, such that the power system 800 or other embodiments thereof could be attached to the aircraft 1 in a different manner, such as for example to an exterior surface of the aircraft 1. In the embodiment of FIG. 8, the aircraft 1 includes an electric motor 810 that is attached to the wing 14 remote from the power system 800 and is electrically connected to be powered by the power system 800.

In this embodiment, the electric energy module 808 further includes anchor points 836 defined in top and bottom surfaces 808*a*, 808*b* of the electric energy module 808, 1008, 1108. The anchor points 836 are structured as load bearing members to support a weight of the power system 800 for removing the power system 800 from the aircraft wing 14.

Figure 9:
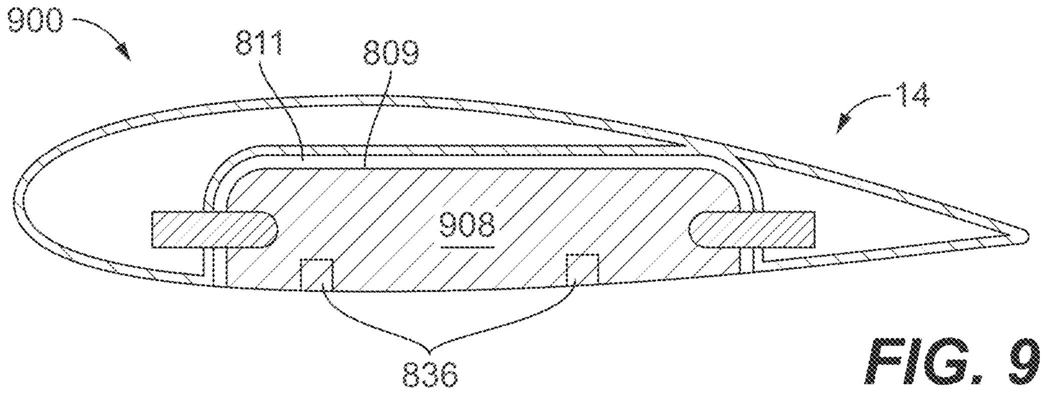
FIG. 9 is a schematic cross sectional side view of the aircraft power system of FIG. 6, showing an embodiment of mounting the energy source within the aircraft.

Referring to FIG. 9, yet another power system 900 is shown. The power system 900 has a bottom surface that is shaped such that it completes the airfoil shape of the wing 14 with which it is flush.

Figure 10:
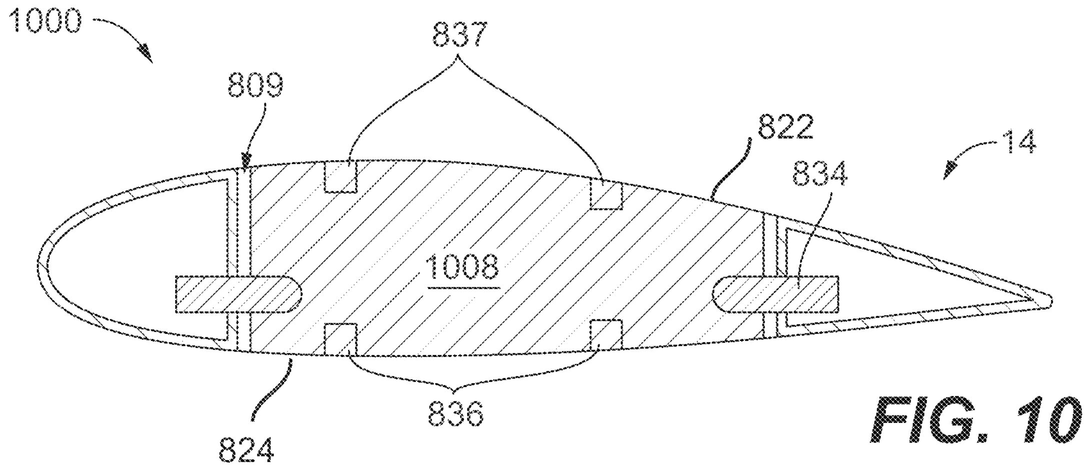
FIG. 10 is a schematic cross sectional side view of the aircraft power system of FIG. 6, showing another embodiment of mounting the energy source within the aircraft.

Referring to FIG. 10, yet another power system 1000 with another embodiment of the wing are shown. In this embodiment, the receptacle 809 passes completely through the wing 14 in a vertical direction (relative to the aircraft 1 being stationary on the ground), and the electric energy module 1008 of the power system 1000 has top and bottom surfaces that are shaped to complete the airfoil shape of the wing 14 around the receptacle 809. In an aspect, this arrangement may accommodate a relatively larger size of the power system 1000.

Figure 11:
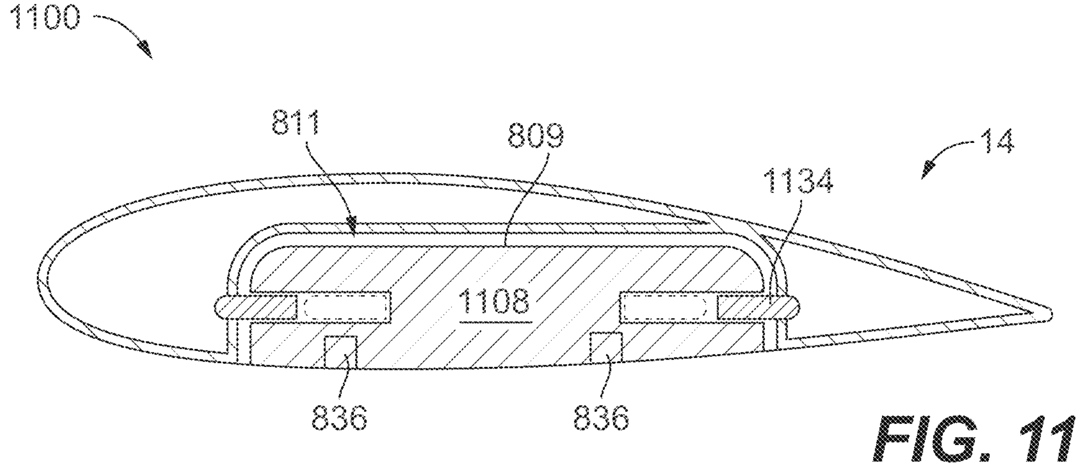
FIG. 11 is a schematic cross sectional side view of the aircraft power system of FIG. 6, showing another embodiment of mounting the energy source within the aircraft.

Referring to FIG. 11, yet another power system 1100 is shown and has a combination of elements from several of the aforementioned embodiments. For example, the connectors 1134 in FIG. 11 retract into the electric energy module when in the disengaged mode, rather than into the wing as in other embodiments. For brevity, since the elements have been described above, their description is not repeated. It is contemplated that in some embodiments the electric energy module 108, 508, 808, 908, 1008, 1108 may extend beyond surrounding wing surfaces 122, 124.

Figure 12:
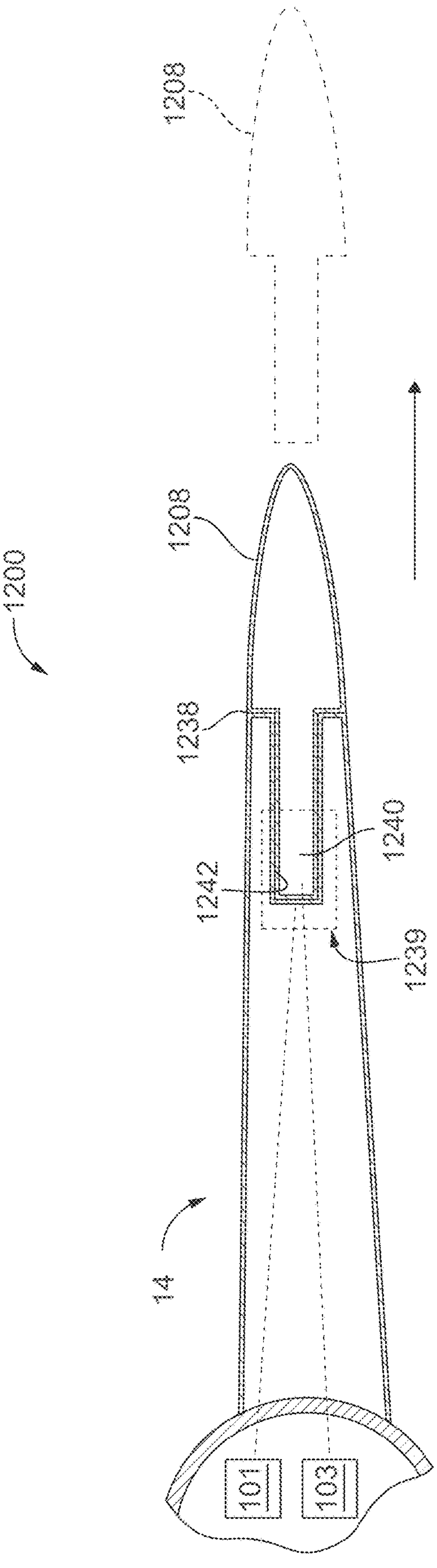
FIG. 12 is a schematic side view of an embodiment of a an aircraft constructed in accordance with at least one aspect of the present disclosure, showing an embodiment of an energy source mounted in a wing tip of an aircraft, separate from an electric machine.

Referring to FIG. 12, yet another embodiment of a power system, the power system 1200, is shown. The electric energy module 1208 of the power system 1200 is received in a receptacle 1242 defined in a tip 1238 of the wing and is shaped to complete the airfoil shape of the wing. The electric energy module 1208 is selectively removably engaged to the wing by a connector module 1239 which in this embodiment is part of the wing 14. The connector module 1239 may be of any suitable type, such as similar to the connector modules above for example.

Figure 13:
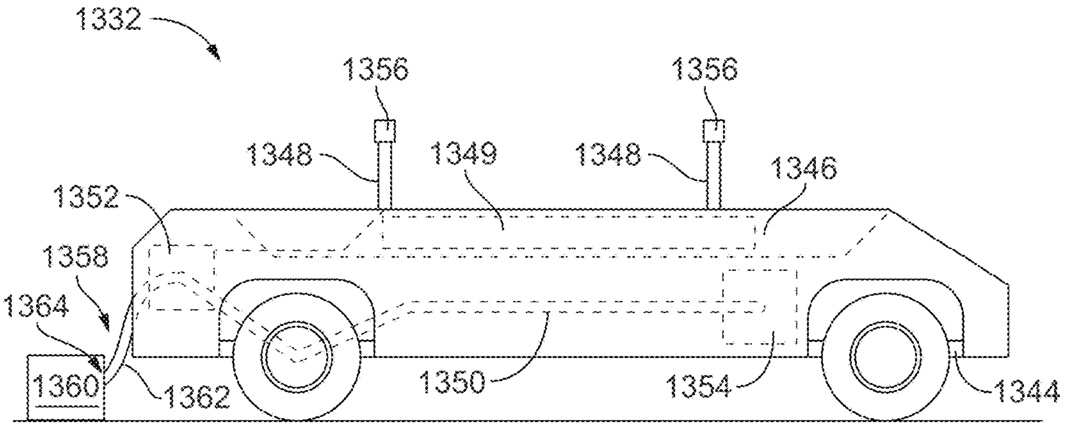
FIG. 13 is a schematic side view of a ground service vehicle constructed in accordance with at least one aspect of the present disclosure.

As shown in FIG. 13 a ground service vehicle (GSV) 1332 (the same or similar to ground vehicle 132) is provided for servicing aircraft and power systems, such as the various embodiments of aircraft and power systems described above. The GSV 1332 comprises a chassis 1344 defining a receiving bay 1346, a support structure 1348, which in this embodiment includes plurality of extendible supports extending from the receiving bay 1346, and a powertrain 1350 operatively connected to wheels or other suitable movers of the GSV 1332. In this embodiment but not necessarily in all embodiments, the powertrain 1350 is an electric powertrain and the GSV 1332 includes an onboard energy source 1352 operatively connected to the electric powertrain 1350 to power the electric powertrain 1350 and enable operation of the GSV 1332.

In some embodiments, one or more of the extendible supports 1348 includes an energy source connector 1356 electrically connected to the onboard energy source 1352 and sized for recharging one or more of the electric energy modules 108, 508, 608, 708, 808, 908, 1008, 1108, 1208 described herein. The extendible supports 1348 are structured to connect with respective anchor points of the power systems described herein above, for supporting the weight of the power system(s) that the GSV 1332 may be designed to service. In some embodiments, the extendible supports 1348 may be operatively connected to a lift mechanism 1349 of the GSV 1332 which may be configured to selectively lower and raise the power system engaged to the supports 1348 into and out of (or toward and away from) the receiving bay 1346.

Hence, the GSV 1332 may engage a given power system and remove that power system from the aircraft after that power system has been disengaged from the aircraft, as described herein above. Once removed, the GSV 1332 may secure the power system in the receiving bay 1346 for transport. In some embodiments, the receiving bay 1346 may be omitted. It is likewise contemplated that a movement system different from the extendible supports 1348 may be used, so long as the functionality described herein is provided.

In embodiments in which the GSV 1332 includes supports 1348 with built-in electrical connector(s) that correspond to respective electrical connectors on the power system(s) that the GSV 1332 may be designed to service, the GSV 1332 engaging a given one of such power systems may thus electrically connect to the electric energy module of that power system and at least in part recharge that electric energy module. In embodiments in which the GSV 1332 does not include supports with built-in electrical connector(s), the GSV 1332 may recharge the electric energy module of that power system via a conventional electrical connection to the onboard energy source 1352, where such an energy source is present and has sufficient charge, and/or via a conventional electrical connection to a stationary energy source 1360, such as a power grid for example. To the latter end, in certain embodiments, the GSV 1332 may have a retractable electrical cord 1362 having a connection point 1364 on a distal end of the retractable cord 1362.

Figure 14:
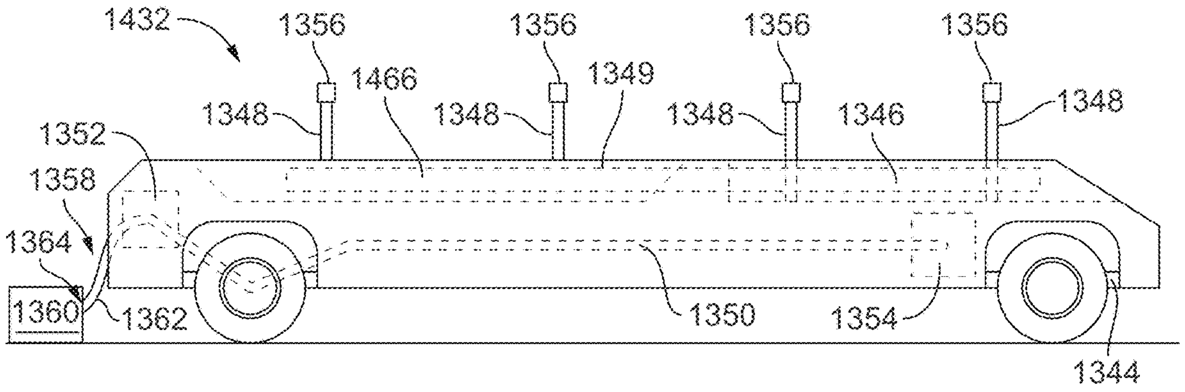
FIG. 14 is a schematic side view of another ground service vehicle constructed in accordance with at least one aspect of the present disclosure.

Shown in FIG. 14, the ground service vehicle 1432 is similar to that of ground service vehicle 1332, however, ground service vehicle 1432 further includes a receiving bay 1466 configured to receive an electric machine 104 having an electric energy module 108 mounted therein. In certain such embodiments, each of the electric energy module receiving bay 1346 and the electric machine/electric energy module combination receiving bay 1466 each include their own respective plurality of extendible supports 1348. It is contemplated however, that a single receiving bay 1349 can be included to receive both of, or one of the electric energy module 108 and electric machine 104/electric energy module combination.

A method for recharging the energy source (e.g. between flights) includes removing the power system 100 from the housing 102. In certain embodiments, removing the power system 100 includes lowering the power system 100 (including both the electric machine 104 and the energy source 108 mounted together with the electric machine 104) out of the housing 102 onto a service vehicle 132 below the wing 14. Removing the power system 600 can be performed in the same or similar manner as described with respect to power system 100, but can additionally include lifting the power system 600 out from a top of the wing 14, before lowering the system 600 onto the ground service vehicle 132.

In certain embodiments, removing the power system 800 includes lowering only the energy source 808 from the wing 14, leaving the electric machine 804 in the housing 802 mounted to the wing 14. In embodiments, removing the power system 600, 1000 can include lifting the power system 600, 1000 out of the wing 14 through the second surface 124, from above the wing 14, and the lowering on to service vehicle 132. In yet further embodiments, removing the power system 1200 can include removing the energy source 1208 in an outward direction from the wing tip 1238 (e.g. axially in direction of arrow A), then lowering onto ground service vehicle 132.

Figure 15:
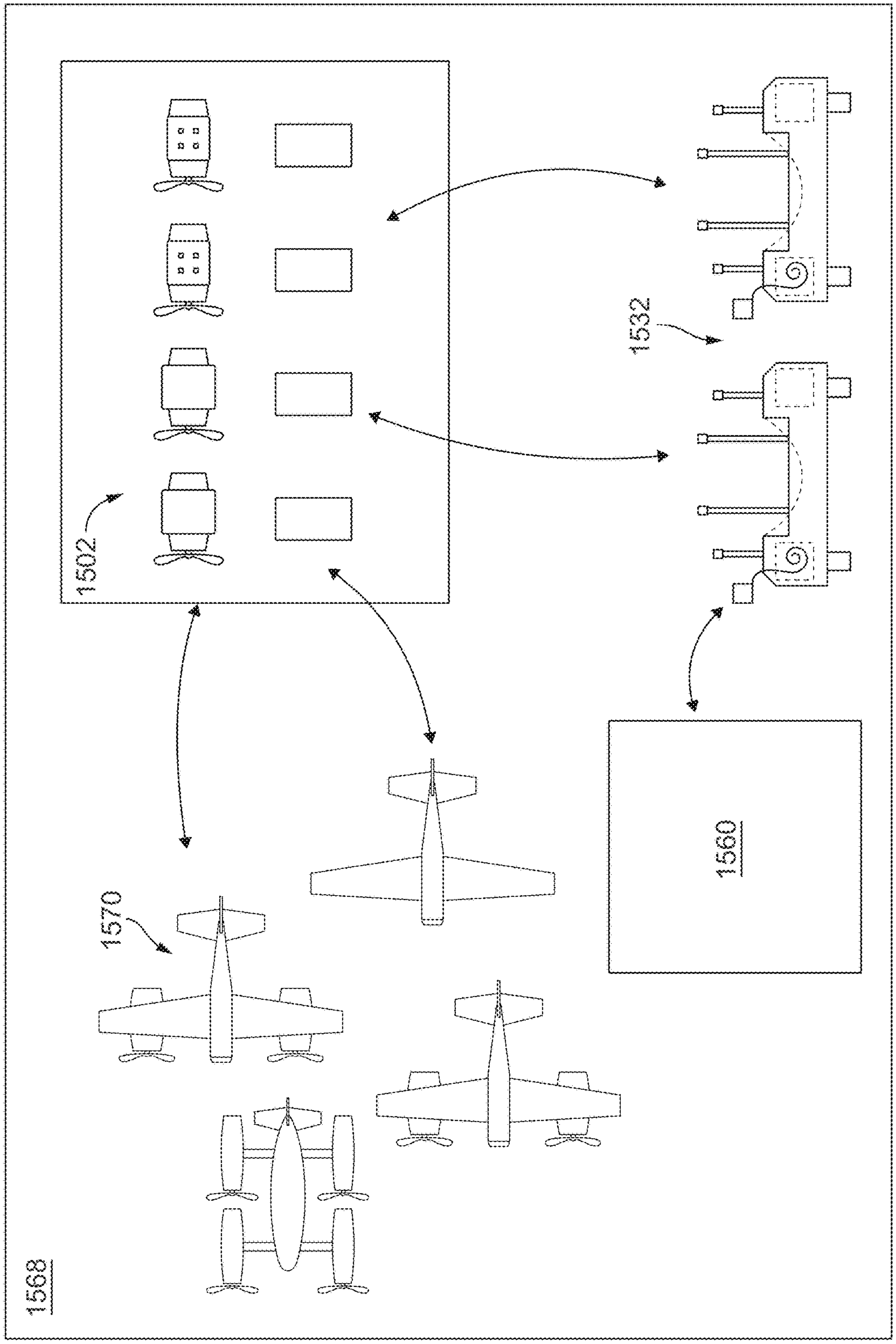
FIG. 15 is a schematic diagram of an airport system constructed in accordance with at least one aspect of this disclosure, showing the relationship between at least the embodiments of FIGS. 1-14 within the airport system.

Referring to FIG. 15, a system 1500 for recharging power systems, such as one or more of the power systems as described herein above, at an airport 1568, comprises, at least one stationary source of electrical power 1560, a fleet of ground service vehicles 1532 configured to swap out power trains of aircraft 1570 that may arrive at the airport 1568 with compatible power trains from a repository of power systems 1502. In the present embodiment, the power systems in the repository are pre-charged (i.e. charged at the moment of arrival of a given aircraft 1570). In some cases, the aircraft 1570 may all be of the same type. In the present embodiment, the aircraft 1570 include a plurality of sizes, models, and types. The stationary source of power 1560 may be configured to charge the ground service vehicles 1532 and/or the power systems. Each of the aircraft 1570 can have a suitable one or more of the power systems as described above herein, and the repository 1502 can include one or more pre-charged power systems that is/are compatible with (e.g. the same as) the one or more of the power systems aircraft 1570.

The system 1500 may thus allow for a method of servicing aircraft, e.g. which may include removing a power system, such as an at least partially discharged power system and/or a power system requiring maintenance, from an aircraft by engaging that power system to one of the GSVs 1532, actuating a connector module (as described above) associated with that power system to disengage that power system from the aircraft, and moving the power system away from the aircraft on the GSV 1532. The method may further include delivering the power system on the GSV 1532 to a staging area and charging and/or performing maintenance on the power system. In some such embodiments, after removal of the power system, and in some cases before or during the charging and/or maintenance of the removed power system, the method further includes moving a compatible power system using anther one of the GSVs 1532, such as a compatible serviced and pre-charged (a.k.a. ready-to-go) compatible power system to the aircraft, positioning it in place of the removed power system using the GSV 1532 and engaging it to the aircraft by correspondingly actuating the connector module (as described above). In at least some cases, this method may reduce time on ground of the aircraft.

Once charging and/or maintenance of the removed power system is complete, that removed power system becomes a ready-to-go power system which may then be used to swap out another power system of another one of the aircraft 1570 by using the GSV 1532 in a similar way. In some embodiments of the system 1500, the power systems and receiving portions of the aircraft that the power system selectively removably engage to (e.g. receptacles as described above) are standardized such that a given power system can be used on two or more different models of aircraft. Stated otherwise, the two or more different models of aircraft may have the same receptacle.

In the foregoing disclosure, some details are omitted for clarity as they can be conventional. Stated otherwise, details that are omitted may be implemented using conventional parts and conventional engineering techniques. Many different embodiments of the methods and systems of the present disclosure are contemplated. Some particular embodiments are described in the form of clauses herein next.

Clause 1. A system (100) for an aircraft (1), comprising: an electric energy module (108); and a connector module (114*c*) operatively connected to the electric energy module, the connector module being:
- structured to attach the electric energy module to the aircraft when the connector module in an engaged mode while in use, and
- operable between the engaged mode (114*a*) and a disengaged mode (114*b*), the connector module in the disengaged mode while in use disengaging the electric energy module from the aircraft.

Clause 2. The system as recited in clause 1, further comprising an electric machine (104) attached to the electric energy module and electrically connected to the electric energy module.

Clause 3. The system as recited in clause 2, wherein the electric machine is electrically connected to the electric energy module via a plurality of conductors (108*c*), and a majority of each conductor of the plurality of conductors being disposed in its entirety mechanically between the electric machine and the electric energy module.

Clause 4. An aircraft comprising the system as recited in any preceding clause, further comprising an electrically-powered system (103), wherein the electric energy module is attached to the aircraft via the connector module and is electrically connected to the electrically-powered system.

Clause 5. The aircraft as recited in clause 4, wherein the electric energy module is electrically connected to the electrically-powered system via the connector module, and the connector module is structured to electrically disconnect the electric energy module from the electrically-powered system when the connector module is operated from the engaged mode to the disengaged mode.

Clause 6. The aircraft as recited in clause 5, wherein the electric energy module is positioned relative to the aircraft such that when the connector module is in the disengaged mode and the aircraft is stationary on a ground (G), gravity acts on the electric energy module to move the electric energy module toward the horizontal ground.

Clause 7. The aircraft as recited in clause 6, wherein:
- the electric energy module comprises an electrical connector (137) on a side (**108*b***) of the electric energy module that faces toward the ground when the aircraft is stationary on the ground;
- the electrical connector is electrically connected to the electric energy module; and
- the electrical connector is sized to charge the electric energy module when connected to an electric power source (132).

Clause 8. The aircraft as recited in clause 1, wherein:
- the connector module includes a movable member (**114*e*) and an actuator (114*d*) operatively connected to the movable member to move the member while the system is in use between an engaged position (114*a*) in which the movable member engages the electrical energy module to the aircraft and a disengaged position (114*b***) in which the movable member disengages the electrical energy module from the aircraft,
- the movable member being in the engaged position when the connector module is in the engaged mode, and
- the movable member being in the disengaged position when the connector module is in the disengaged mode.

Clause 9. The aircraft as recited in clause 8, wherein the movable member is a plurality of movable members.

Clause 10. The aircraft as recited in clause 9, wherein:
- a first sub-set of the plurality of movable members is disposed on a first side (**108*a*) of the electrical energy module and a second sub-set of the plurality of movable members is disposed on a second side (108*b***) of the electrical energy module, and
- the second side is opposite the first side.

Clause 11. The aircraft as recited in clause 8, wherein the movable member is slidable between the engaged position and the disengaged position.

Clause 12. The aircraft as recited in clause 8, wherein:
- one of the electrical energy module and the aircraft comprises a mating female structure corresponding to the movable member;
- the movable member extends into the mating female structure when the movable member is in the engaged position; and
- the movable member is disposed outside of the mating female structure when the movable member is in the disengaged position.

Clause 13. An on-ground service system (1568), comprising:
- the aircraft (1) of clause 7; and
- a ground service vehicle (132, 1532) that includes an electrical connector (156, 1356) structured to electrically connect to the electrical connector of the electrical energy module (108) when the aircraft is stationary on the ground (G).

Clause 14. The on-ground service system of clause 13, wherein:
- the electrical energy module comprises a support structure (836,837) that is structured to support a weight of the electrical energy module; and
- the ground vehicle further comprises a movable structure (1348), the movable structure being structured to movable relative to a rest of the ground vehicle to engage the support structure and to remove the electrical energy module from the aircraft while engaged to the support structure.

Clause 15. The on-ground service system of clause 14, wherein the electrical connector of the ground vehicle is part of the movable structure of the ground vehicle.

Clause 16. The on-ground service system of clause 15, wherein the electrical connector of the electrical energy module is part of the support structure of the electrical energy module and is positioned relative to the support structure such that when the movable structure engages the support structure, the electrical connector of the ground vehicle electrically connects to the electrical connector of the electrical energy module.

Clause 17. The on-ground service system of clause 15, further comprising an electrical machine (104) attached to the electrical energy module such that the electrical machine is removable from the aircraft together with the electrical energy module as a unit, and wherein the movable structure of the ground vehicle and the ground vehicle are structured to support a weight of the unit.

Clause 18. The on-ground service system of clause 14, wherein
- the aircraft of clause 7 is a first aircraft;
- the on-ground service system further comprises a second aircraft that is of a different model than the first aircraft; and
- the second aircraft is structured to removably receive the electrical energy module of the first aircraft from the ground vehicle to power at least one system of the second aircraft.

Clause 19. An aircraft (1) comprising:

an electrical machine receptacle (109) defined in any of: a wing (14) of the aircraft, a tail (16) of the aircraft, and/or a fuselage (12) of the aircraft, the electrical machine receptacle configured to receive an aircraft power system (100), and a member (114) operatively connected to the electrical machine receptacle, the member movable between an engaged mode (**114*a*) in which the member secures the aircraft power system to the electrical machine receptacle and a disengaged mode (114*b***) in which the member is disengaged from the aircraft power system and the aircraft power system is disengaged from the electric machine receptacle.

Clause 20. The aircraft of clause 19, wherein the aircraft power system includes one of or both of an electrical energy module (108) and an electrical machine (104).

Clause 21. The aircraft of clause 20, wherein the member includes a conductor (**108*c*) electrically connected to an electrical system (103**) of the aircraft, wherein in the engaged mode, the member contacts the conductor of the power system and thereby electrically connects the one of or both of the electrical energy module of the power system and the electrical machine of the power system to the electrical system of the aircraft, and wherein in the disengaged mode of the member the conductor of the member is out of contact with the conductor of the power system and thereby electrically disconnects the one of or both of the electrical energy module of the power system and the electrical machine of the power system from the electrical system of the aircraft.

Clause 22. A method of servicing an aircraft (1), comprising:
- positioning the aircraft on a ground (G);
- while the aircraft is on the ground, actuating a connector module (111) of the aircraft to release a power system (100) of the aircraft; and while the aircraft is on the ground, moving the power system of the aircraft away from the aircraft using a mechanical system (1342) that is separate from the aircraft.

Clause 23. The method as recited in clause 22, wherein the mechanical system is a ground service vehicle (132).

Clause 24. The method as recited in clause 22, further comprising, while the aircraft is on the ground, moving a different power system to the aircraft in place of the power system and actuating the connector module to engage the different power system to the aircraft.

Clause 25. The method as recited in any preceding clause, wherein each one of the power system and the different power system includes one of:

an electric machine (104) operatively connected to an electric power source (103) of the aircraft when that one of the power system and the different power system is engaged to the aircraft; and both a given electric machine (104) and an electrical energy module (108) electrically connected to the given electric machine to power the given electric machine.

Clause 26. A power system (100) for an aircraft (1), comprising:

an electrical energy module (108); and an electric machine (104) attached to the electrical energy module and electrically connected to the electrical energy module via a plurality of conductors (108*c*) sized for the electrical energy module to be operable to power the electric machine.

Clause 27. The system as recited in clause 26, further comprising a connector (114*c*) attached or engaged to one or both of the electrical energy module and the electric machine, the connector being operable to selectively removably engage the system to an aircraft and to selectively disengage the system from the aircraft.

Clause 28. The system as recited in clause 27, wherein the connector is retractable into a portion of the system to selectively disengage the system from the aircraft.

Clause 29. The system as recited in clause 27, wherein the connector includes an electrical conductor (108*c*) that is electrically connected to the electrical energy module.

Clause 30. The system as recited in clause 26, wherein at least a part of one or both of the electrical energy module and the electric machine defines an airfoil surface (122, 124).

Clause 31. The system as recited in clause 27, wherein one or both of the electrical energy module and the electric machine includes at least one anchor point (137) configured as a load bearing member for removing the one or both of the electrical energy module and the electric machine from an aircraft (1).

Clause 32. The system as recited in clause 30, wherein the airfoil surface is a first airfoil surface, and at least another part of one or both of the electrical energy module and the electric machine defines a second airfoil surface opposite the first airfoil surface, and the first and second airfoil surfaces (122, 124) define a lift direction (126).

Clause 33. The system as recited in clause 27, further comprising a wing (14) of the aircraft and wherein:

the wing defines a cavity (109) that selectively removably receives at least a part of one or at least a part of both of the electrical energy module (108) and the electric machine (104) in the cavity;

the wing includes a connecting module (111) open to the cavity; and the connector selectively removably engages the connecting structure of the wing and thereby selectively removably engages the electrical energy module and the electric machine to the wing.

Clause 34. The system as recited in clause 33, wherein at least a part of one or both of the electrical energy module and the electric machine defines an airfoil surface that completes an airfoil surface (122, 124) of the wing.

Clause 35. An aircraft (1) comprising:

an energy source receptacle (109) defined in a portion of the aircraft configured to receive an energy source (108), the energy source being selectively detachably connected to the portion of the aircraft and being at least in part selectively removably received in the energy source receptacle; and an electric motor (104) mounted to the aircraft and electrically connected to the energy source at least while the energy source is received in the energy source receptacle.

Clause 36. The aircraft as recited in clause 35, wherein the energy source receptacle is defined in a wing (14) of the aircraft and is recessed relative to a first surface (122) (124) of the wing, and wherein the energy source receptacle only extends through the wing stopping short of a second surface of the wing opposite the first surface.

Clause 37. The aircraft as recited in clause 35, wherein the first and second surfaces of the wing define an airfoil with an upward lift direction (126).

Clause 38. The aircraft as recited in clause 35, wherein the energy source receptacle is defined in a wing (14) of the aircraft and passes completely through the wing, making a respective opening through each of a first and second surfaces of the wing.

Clause 39. The aircraft as recited in any preceding clause, further including at least one electrical connector (114) disposed in the wing and at least partially in the energy source receptacle configured to retain the energy source within the energy source receptacle.

Clause 40. The aircraft as recited in clause 39, wherein the at least one electrical connector is configured to electrically connect the energy source to the electric machine and/or at least one additional electrically powered aircraft component (103) through an electrical conductor (108*c*).

Clause 41. The aircraft as recited in clause 39, wherein the at least one electrical connector is operatively connected to an actuator (114*d*) of the aircraft and the actuator is operable to retract the electrical connector to selectively detach the energy source from the aircraft.

Clause 42. The aircraft as recited in clause 38, wherein the wing further includes a plurality of structural ribs (518, 818), wherein density of the ribs a proximate the energy source receptacle is greater than density of the ribs in a remainder of the wing.

Clause 43. The aircraft as recited in any of clauses 36 to 38, wherein the wing includes a panel (130) slidingly engaged to the first surface of the wing moveable between an open position and a closed position, wherein in the absence of an energy source, the panel is in the closed position.

Clause 44. A method comprising:

removing an energy source (108) from an energy source receptacle (109) in an aircraft (1) without removing an electric machine (104) of the aircraft, the electric machine being powered by the energy source when the aircraft is in use.

Clause 45. The method as recited in clause 44, wherein the energy source receptacle is in a wing (14) of the aircraft, and the removing includes lowering the energy source out of the energy source receptacle onto a service vehicle (132).

Clause 45. The method as recited in clause 44, wherein the energy source receptacle is in a wing (14) of the aircraft, and the removing the energy source includes lifting the energy source upward from the energy source receptacle.

Clause 46. The method as recited in clause 44, wherein the energy source receptacle is in a wing (14) of the aircraft, and the removing the energy source includes removing the energy source in an outward direction from a tip of the wing.

Clause 47. An aircraft service kit 1502, comprising:

one or both of an electrical energy module (108) of an aircraft and an electric machine (104) of the aircraft, the electrical energy module sized to power the electric machine;

a ground service vehicle (132) defining a receiving bay (1349) at a top side of the ground service vehicle the receiving bay structured to support the one or both of the electrical energy module and the electric machine on the ground service vehicle; and a structure (1348) extending from a body (1344) of the ground service vehicle, the structure being:

movable relative to the body above the receiving bay to a receiving position, structured to removably engage the one or both of the electrical energy module and the electric machine when in the receiving position, structured to support a weight of the one or both of the electrical energy module and the electric machine, and while removably engaged to the one or both of the electrical energy module and the electric machine, movable with the one or both of the electrical energy module and the electric machine, relative to the body, from the receiving position to a secured position in which the one or both of the electrical energy module and the electric machine is secured in the receiving bay of the ground service vehicle.

Clause 48. The kit as recited in clause 47, further comprising an electrical energy source (1352) that is electrically connectable to the electrical energy module (108) to charge the electrical energy module.

Clause 49. The kit as recited in clause 48, wherein the electrical energy source is an onboard electrical energy source (1352), the ground service vehicle includes an electric power system (1350) operable to move the ground service vehicle, and the electric power system is powered by the onboard electrical energy source.

Clause 50. The kit as recited in clause 49, wherein:

the structure includes a plurality of extendible supports (1348), at least one of the extendible supports includes a conductor (1356) electrically connected to the onboard energy source (1352), the electrical energy module includes a corresponding conductor (137) positioned relative to a rest of the electrical energy module such that when the electrical energy module is engaged by the at least one of the extendible supports, the conductor of the at least one of the extendible supports electrically mates with the corresponding conductor of the electrical energy module to allow charging of the electrical energy module.

Clause 51. A method of ground servicing an aircraft (1) comprising:

positioning a ground service vehicle (1332) proximate the aircraft;

connecting extendible supports (1348) of the ground service vehicle to anchor points (137) of a power system (100) of the aircraft;

after the connecting, disengaging a connector module (111) of the aircraft that engages the power system to a rest of the aircraft; and after the disengaging, removing the power system from the aircraft using the extendible supports.

Clause 52. The method as recited in clause 51, wherein the disengaging includes sending a signal to the connector module (111) to operate a powered actuator (113) associated with the connector module.

Clause 53. The method as recited in clause 51, wherein the power system includes an electrical energy module (108) and the method includes recharging the electrical energy module from the ground service vehicle after the removing the power system from the aircraft.

Clause 54. The method as recited in clause 53, wherein the recharging includes connecting the ground service vehicle to a stationary electrical energy source (1360).

Clause 55. The method as recited in clause 51, wherein the removing includes moving the power system out of a receptacle (109) of the aircraft.

Clause 56. The method as recited in any preceding clause, wherein the removing includes lifting the power system from a receptacle in the aircraft opening upward, and then lowering the power system onto a receiving bay of the ground service vehicle.

Clause 57. The method as recited in clause 51, wherein the power system includes one or both of an electric machine (104) and an electrical energy module (108).

Clause 58. The method as recited in clause 57, wherein the power system includes the electric machine and the electric machine is sized to drive an air mover (106) of the aircraft.

Clause 59. An aircraft propulsor system (100) comprising:

an energy source housing (109);

an energy source (108) within the energy source housing; and at least one electrical connector (114) extending from the energy source through the energy source housing electrically connecting the energy source to an aircraft (1).

Clause 60. The system as recited in clause 59, wherein the at least one electrical connector is retractable within the energy source housing between a first position (114*a*) and a second position (114*b*), wherein the first position is an unlocked position, and the second position is a locked position.

Clause 61. The system as recited in clause 59, wherein the energy source housing defines an airfoil surface (122,124).

Clause 62. The system as recited in clause 61, wherein the energy source housing includes at least one anchor point (137) configured as a load bearing member for removing the energy source housing from an aircraft wing, wherein the anchor point is defined in the airfoil surface.

Clause 63. The system as recited in clause 61, wherein the airfoil surface is a first airfoil surface (122), and wherein the energy source housing includes a second airfoil surface (124) opposite the first airfoil surface, wherein the first and second airfoil surfaces define a lift direction (126).

Clause 64. The system as recited in clause 63, wherein first and second airfoil surfaces of the energy source housing (108*a*, 108*b*) match an airfoil surface of the wing (14).

Clause 65. The system as recited in clause 63, wherein the first airfoil surface includes at least one lower anchor point (137) as a load bearing member, and wherein the second airfoil surface includes at least one upper anchor point (836) as a load bearing member.

Clause 66. A system (1568) for a plurality of different models of aircraft (1570), comprising:

a plurality of electric energy modules (1502), each electric energy module of the plurality of electric energy modules configured to power at least one electric component of an aircraft (1); and a plurality of connectors (114*c*), each connector of the plurality of connectors configured to:

a) attach to an aircraft of the plurality of different models of aircraft, and b) selectively engage a respective connector of the plurality of connectors to any one of the plurality of electric energy modules.

Clause 67. The system of clause 66, wherein the connector is configured to electrically connect the any one of the plurality of electric energy modules to an electrical system (103) of the aircraft to which that connector is configured to be attached.

Clause 68. The system of clause 67, wherein the connector includes a body and a conductor (114*e*) movable relative to the body between:

an engaged mode (114*b*) in which the conductor engages a respective one of the plurality of electric energy modules to the connector and electrically connects to the any one of the plurality of electric energy modules, and a disengaged mode (114*a*) in which the conductor is disengaged from and electrically disconnected from the any one of the plurality of electric energy modules, wherein the conductor is sized to accommodate a rated electrical current associated with the electrical system of the aircraft.

Clause 69. The system of clause 68, wherein the conductor is one of a plurality of conductors.

Clause 70. The system of clause 68, wherein the conductor extends into a corresponding aperture (115) in a respective one of the plurality of electric energy modules when the conductor is in the engaged mode.

Clause 71. The system of clause 66, wherein each electric energy module of the plurality of electric energy modules includes: a top side (108*a*), a bottom (108*b*) side opposite the top side, the bottom side facing a tarmac when that electric energy module is engaged to a given aircraft of the plurality of aircraft via a respective connector of the plurality of connectors while the given aircraft is disposed on the tarmac/ground (G), and an electrical quick connect (137) on the bottom side.

Clause 72. The system of clause 71, wherein the electrical quick connect includes a plurality of a structural components structured to support a weight of that electric energy module on the plurality of structural components.

Clause 73. The system of clause 66, further comprising a plurality of electrical machines, each electrical machine of the plurality of electrical machines being attached to and electrically connected to a respective electrical energy module of the plurality of electric energy modules.

Clause 74. The system of clause 72, wherein the electrical machine is attached to a housing (102) of the respective electrical energy module.

Clause 75. The system of clause 72, wherein the electrical machine is attached to a respective electrical energy module via the quick connect.

Clause 76. The system of clause 72, wherein the quick connect includes a powered actuator operable to disengage the quick connect.

Clause 77. The system of clause 66, wherein the connector includes a powered actuator (113) operable to disengage the connector from a respective one of the plurality of electric energy modules.

Clause 78. A method of servicing aircraft, comprising:

removing an at least partially discharged energy source (108) from a receptacle in an aircraft (1) onto a ground service vehicle (132); and installing a charged energy source into the receptacle in an aircraft.

Clause 79. The method as recited in clause 78, wherein installing a charged energy source is performed by the same ground service vehicle that performed removing the energy source.

Clause 80. The method as recited in clause 78, wherein installing a charged energy source is performed by a different ground service vehicle than the ground service vehicle that performed removing the energy source.

Clause 81. The method as recited in clause 78, wherein installing a charged energy source includes installing the same energy source that was removed from the aircraft.

Clause 82. The method as recited in clause 78, wherein installing a charged energy source includes installing a different energy source than the energy source that was removed from the aircraft.

Clause 83. The method as recited in clause 78, further comprising delivering the at least partially discharged energy source to a staging area, wherein the staging area is configured to recharge the at least partially discharged energy source.

Clause 84. The method as recited in clause 83, further comprising retrieving the charged energy source from the staging area after recharging is complete.

Clause 85. The method as recited in clause 84, further comprising connecting the charged energy source to an aircraft that is the same aircraft from which the energy source was removed.

Clause 86. The method as recited in clause 84, further comprising connecting the charged energy source to an aircraft that is a different aircraft from which the energy source was removed.

Clause 87. The method as recited in clause 84, wherein the energy source is housed within an energy source housing mounted together with an electric machine, and further comprising connecting the charged energy source and electric machine to an aircraft that is the same model aircraft as the aircraft from which the energy source and propulsor were removed.

Clause 88. The method as recited in clause 84, wherein the energy source is housed within an energy source housing (109) mounted together with an electric machine (104), and further comprising connecting the charged energy source and electric machine to an aircraft that is a different model aircraft than that of the aircraft from which the energy source and propulsor were removed.

The methods and systems of the present disclosure, as described above and shown in the drawings, provide for efficient charging of power systems that may be used in hybrid electric, or all electric, aircraft. Such systems and methods increase the speed at which an aircraft can be made ready for a next flight, and can allow for a repository of multiple different types and sizes of energy sources and/or power systems that can be used for multiple different aircraft. While the apparatus and methods of the subject disclosure have been shown and described, those skilled in the art will readily appreciate that changes and/or modifications may be made thereto without departing from the scope of the subject disclosure.

What is claimed is:

1. An on-ground service system, comprising:

an aircraft including:

an energy source received inside a receptacle formed in a wing of the aircraft, the receptable having an opening permitting a removal of the energy source from the receptacle;

a connector module operatively connected to the energy source, the connector module being:

structured to attach the energy source to the aircraft when the connector module is in an engaged mode while in use; and operable between the engaged mode and a disengaged mode, with the connector module disengaging the energy source from the aircraft in the disengage mode; and an aircraft power system powered by the energy source and connected to the energy source via the connector module, wherein:

the energy source is attached to the aircraft via the connector module;

the connector module is structured to disconnect the energy source from the aircraft power system when the connector module is operated from the engaged mode to the disengaged mode;

the energy source is positioned relative to the aircraft such that when the connector module is in the disengaged mode and the aircraft is stationary on a ground, gravity acts on the energy source to move the energy source toward the ground;

the energy source comprises a connector on a side of the energy source that faces toward the ground when the aircraft is stationary on the ground;

the connector is connected to the energy source; and the connector is sized to permit charging of the energy source; and a ground vehicle that includes a connector structured to connect to the connector of the energy source when the aircraft is stationary on the ground, wherein:

the energy source comprises a support structure that is structured to support a weight of the energy source; and the ground vehicle further comprises a movable structure, the movable structure being structured to move relative to a rest of the ground vehicle to engage the support structure and to remove the energy source from the aircraft while engaged to the support structure.

2. The on-ground service system of claim 1, wherein the connector of the ground vehicle is part of the movable structure of the ground vehicle.

3. The on-ground service system of claim 2, wherein the connector of the energy source is part of the support structure of the energy source and is positioned relative to the support structure such that when the movable structure engages the support structure, the connector of the ground vehicle connects to the connector of the energy source.

4. The on-ground service system of claim 2, wherein the aircraft power system is removable from the aircraft together with the energy source as a unit, and wherein the movable structure of the ground vehicle and the ground vehicle are structured to support a weight of the unit.

5. The on-ground service system of claim 1, wherein:

the aircraft is a first aircraft;

the on-ground service system further comprises a second aircraft that is of a different model than the first aircraft; and the second aircraft is structured to removably receive the energy source of the first aircraft from the ground vehicle to power at least one system of the second aircraft.

6. The on-ground service system as defined in claim 1, wherein:

the opening of the receptacle is a downward-facing opening; and the energy source is movable away from the aircraft by lowering the energy source from the receptacle through the downward-facing opening.

7. The on-ground service system as defined in claim 1, wherein the energy source has a bottom surface shaped to complete an airfoil shape of the wing across the opening of the receptacle.

8. The on-ground service system as defined in claim 1, the aircraft includes a panel extending across the opening of the receptacle and movable from a closed position to an open position.

9. The on-ground service system as defined in claim 8, wherein the panel completes an airfoil shape of the wing when the panel is in the closed position.

* * * * *